(12) United States Patent
Magne et al.

(10) Patent No.: US 10,048,388 B2
(45) Date of Patent: Aug. 14, 2018

(54) DEVICE FOR DETECTING RADIATION AND ASSOCIATED DETECTION DEVICE

(71) Applicant: COMMISSARIAT A L'ENERGIE ATOMIQUE ET AUX ENERGIES ALTERNATIVES, Paris (FR)

(72) Inventors: Sylvain Magne, Chatillon (FR); Karim Boudergui, Nogent-le-Phaye (FR); Hamid Makil, Chilly-Mazarin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/315,628

(22) PCT Filed: Jun. 1, 2015

(86) PCT No.: PCT/EP2015/062067
§ 371 (c)(1),
(2) Date: Dec. 1, 2016

(87) PCT Pub. No.: WO2015/185472
PCT Pub. Date: Dec. 10, 2015

(65) Prior Publication Data
US 2018/0074214 A1 Mar. 15, 2018

(30) Foreign Application Priority Data
Jun. 3, 2014 (FR) .................... 14 55032

(51) Int. Cl.
*G01T 1/20* (2006.01)
*G01T 1/203* (2006.01)

(52) U.S. Cl.
CPC ............ *G01T 1/2012* (2013.01); *G01T 1/201* (2013.01); *G01T 1/2002* (2013.01); *G01T 1/203* (2013.01)

(58) Field of Classification Search
CPC .................................................. G01T 1/2012
See application file for complete search history.

(56) References Cited

U.S. PATENT DOCUMENTS

| 5,665,972 A | 9/1997 | Dickinson et al. |
| 2003/0057385 A1* | 3/2003 | Magne .................... G01T 1/105 250/580 |

(Continued)

FOREIGN PATENT DOCUMENTS

| EP | 1 273 931 A1 | 1/2003 |
| FR | 2 906 887 A1 | 4/2008 |
| WO | 97/24631 A1 | 7/1997 |

OTHER PUBLICATIONS

International Search Report dated Sep. 9, 2015 in PCT/EP2015/062067.

(Continued)

*Primary Examiner* — Hugh H. Maupin
(74) *Attorney, Agent, or Firm* — Oblon, McClelland, Maier & Neustadt, L.L.P.

(57) ABSTRACT

A radiation-detecting device including at least two radiation detectors distributed in series along a support cable, each detector including an optically stimulated luminescence detection element which is optically coupled to at least one optical fiber, each optically stimulated luminescence detection element being held opposite a first end of the optical fiber by a mechanical part fixed to the support cable, the mechanical part being held in a flexible cable by a holding mechanism, second ends of each optical fiber leading to the same first end of the flexible cable.

17 Claims, 5 Drawing Sheets (56) References Cited

U.S. PATENT DOCUMENTS

2006/0138330 A1    6/2006   Baldwin et al.
2006/0266948 A1   11/2006   Hofstetter et al.
2009/0321650 A1   12/2009   Kadner et al.
2010/0005860 A1    1/2010   Coudray et al.

OTHER PUBLICATIONS

Serge M. Melle, et al., "Practical fiber-optic Bragg grating strain gauge system", Applied Optics, vol. 32, No. 19, 1993, pp. 3601-3609.

S. Magne, et al., "Multichannel Dosemeter and $Al_2O_3$:C Optically Stimulated Luminescence Fibre Sensors of Use in Radiation Therapy: Evaluation with Electron Beams", Radiation Protection Dosimetry, vol. 131, No. 1, 2008, pp. 93-99.

Alain Rocher, et al., "Caractérisation par spectrométrie gamma Cd—Zn—Te de la contamination des circuits des centrales nucléaires.", Journées SFRP, 2013, Paris, pp. 1-15.

U.S. Appl. No. 14/345,294, filed Mar. 17, 2014, US 2014-0298925 A1, Claude Voyeux, et al.

U.S. Appl. No. 14/759,014, filed Jul. 2, 2015, US 2015-0346362 A1, Vladimir Kondrasovs, et al.

U.S. Appl. No. 14/761,466, filed Jul. 16, 2015, US 2015-0346352 A1, Romain Coulon, et al.

U.S. Appl. No. 15/302,122, filed Oct. 5, 2016, Mathieu Thevenin, et al.

\* cited by examiner

Fig. 1

PRIOR ART

Fig. 2

PRIOR ART

DEVICE FOR DETECTING RADIATION AND ASSOCIATED DETECTION DEVICE

TECHNICAL FIELD AND PRIOR ART

The invention relates to a radiation-detecting device as well as a detecting system able to determine radiations present in a facility.

The radiations concerned are, for example, photons with an energy between 50 KeV and 6 MeV, or even more, electrons with an energy higher than one MeV, etc.

The protection of people from radiation which intervene in an electronuclear environment is obligatory for the purpose of minimising the exposure thereof. Respecting the ALARA ("As Low As Reasonably Achievable") principle has significant regulatory, economic and logistic repercussions on work organisation.

A personnel dosimetry is thus implemented at all the steps of a fuel cycle, from its preparation to the monitoring of a plant operation, to the follow-up of its clean-up for the dismantling thereof and the storage of waste resulting from the deconstruction thereof. Dismantling techniques (i.e. robotics, remote control operation, dosimetry) have advanced over time and enable infrastructures to be deconstructed as soon as possible after permanent closure by minimising worker exposure. A dosimetry enables waste storage and management to be optimised, the clean-up impact on response personnel to be anticipated and a dismantling scenario optimised in terms of logistics, cost and risk control to be developed. Upstream of the cycle, dosimetry relates to the follow-up of activities of operating infrastructures (power plants, production plants, etc.).

The problem of detecting contamination existing in limited access areas such as, for example, piping ducts, is particularly important to solve. U.S. Pat. No. 5,665,972 discloses devices which measure t contamination in piping ducts. The measurements made are one dimension measurements also called 1-D measurements. In the following of the description, the respective abbreviations "0-D", "1-D" and "2-D" are frequently used in place of the terms "point", "one dimension" and "two dimensions".

Figure 1:
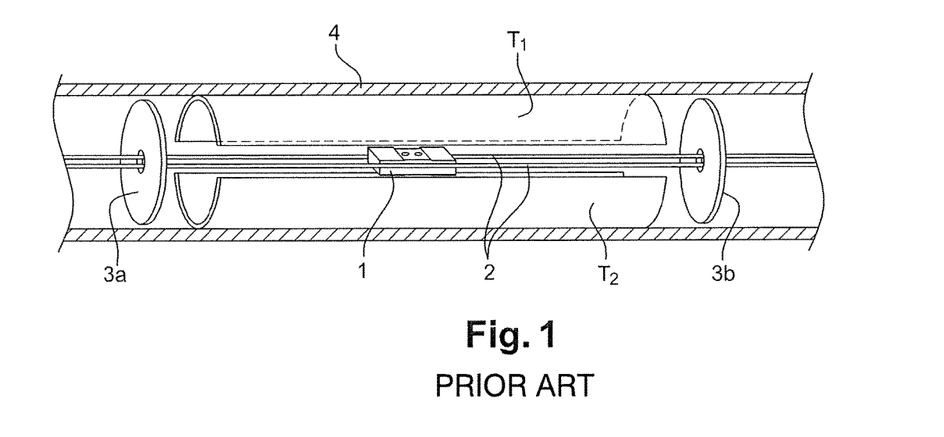
FIG. 1, already described, represents a first radiation-detecting device according to prior art.

A first device disclosed in U.S. Pat. No. 5,665,972 is represented in FIG. 1. It comprises a detection element 1 formed by a plurality of thermo-luminescent dosimeters, for example four dosimeters, inserted in a support. The detection element 1 is fixed on its side walls to flexible metal cables 2. Two disks 3a, 3b pierced at the centre thereof are disposed on either side of the detecting element 1, the flexible metal cables 2 passing through the disks via their piercing. The disks 3a, 3b bear against the internal wall of the duct 4 the contamination of which is to be measured. The disks 3a, 3b have the purpose of holding the detection element 1 substantially along the axis of the duct by means of pre-tensioning the cables. Two sandwich half-tubes $T_1$, $T_2$ are placed facing each other on the internal wall of the duct 4 in order to hold a minimum distance between both disks. The detection of contamination inside the duct is made by drawing, by moving the detecting element 1 inside the duct.

The device represented in FIG. 1 has some drawbacks. The presence of the sandwich half-tubes $T_1$, $T_2$ does not enable curves to be crossed. This device can thus be only used in rectilinear ducts. Moreover, thermo-luminescent dosimeters do not allow for an operational use since they require to dismantle the assembly after each exposure, and then, to transmit the dosimeters to a specialised laboratory to make measurements.

A second device disclosed in U.S. Pat. No. 5,665,972 is represented in FIG. 2.

It comprises a series of detectors 5. Each detector 5 consists of a miniature Geiger-Muller detector inserted in a protective shell. The shells are connected to each other by a carrier cable 6 consisting of two basic flexible metal cables, each basic flexible metal cable having a 1.6 mm diameter. The carrier cable 6 has the function of drawing all the detectors into the duct 4 the contamination of which is to be measured. An electrical cable 7 connects the different detectors 5 to each other. The electrical cable 7 has the function of providing the Geiger-Muller detectors with high voltage supply and of conveying the measurement signals.

Figure 2:
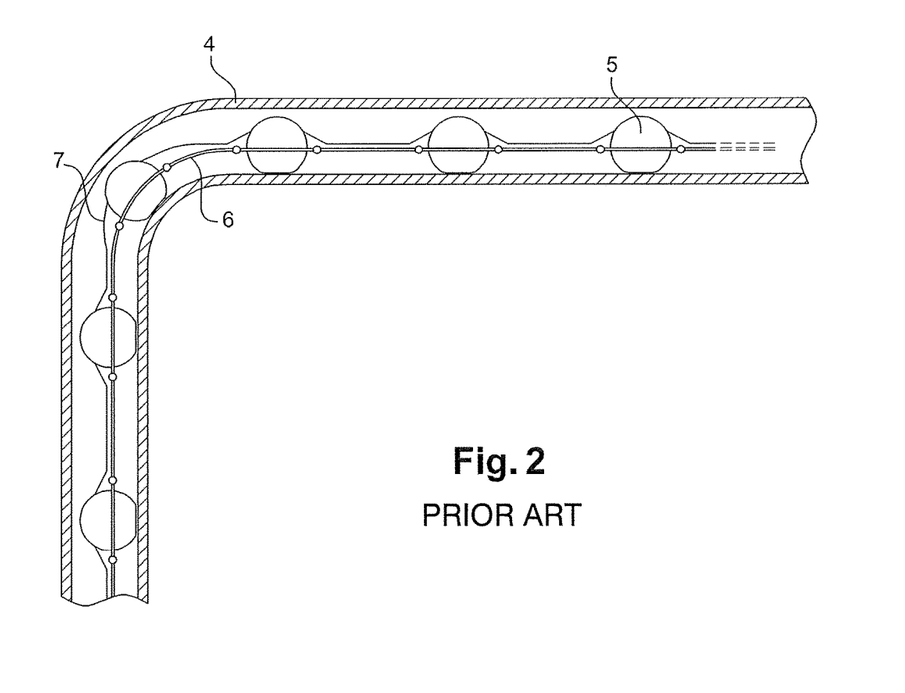
FIG. 2, already described, represents a second radiation-detecting device according to prior art.

The device of FIG. 2 has also drawbacks. Indeed, Geiger-Muller detectors, even miniature ones, remain relatively bulky. Thereby, it is not possible to perform dose rate measurements in ducts having a very low diameter such as, for example, conduits with an 8 mm diameter. Another drawback of Geiger-Muller detectors is that they require a high voltage supply and that they are "illuminated" by high dose rates. In addition, the transmission of a measurement signal is disturbed when the cable length is too large (for example, beyond 20 m) and the resolution of the miniature Geiger-Muller detector offset by a large cable length is in the order of one mGy/h, which is not sufficient at the ultimate decontamination stages where the dose rate reaches values of a few µGy/h.

A common drawback of both above-described devices of prior art is that they have to be installed by drawing, thereby requiring the presence of an access to each of both ends of the duct to be analysed. Another common drawback of both devices is that the ducts in question have a relatively high diameter, typically between 25 mm and 50 mm.

The invention does not have the abovementioned drawbacks.

DISCLOSURE OF THE INVENTION

Indeed, the invention relates to a radiation-detecting device comprising at least two radiation detectors distributed in series along a support cable, each detector comprising an optically stimulated luminescence (OSL) detection element which is optically coupled to at least one optical fibre, each OSL detection element being held opposite a first end of the optical fibre by a mechanical part fixed to the support cable, the mechanical part being held in a flexible cable by holding means, the second ends of each optical fibre leading to the same first end of the flexible cable.

According to the preferential embodiment of the invention, the mechanical part which encloses the support cable comprises a first threaded bore and a second bore aligned with the first bore, the OSL detection element being attached in a screw itself screwed in the first bore and the optical fibre being fixed in the second bore.

According to another further characteristic of the invention, the holding means comprise a carrier cylinder made of a deformable solid material on which the optical fibres are wound, preferentially helically wound.

According to yet another further characteristic of the invention, a plurality of optical fibres is coupled to the same OSL detection element, the plurality of optical fibres being gathered in a capillary pipe as a beam of optical fibres.

According to yet another further characteristic of the invention, an optical fibre containing a plurality of fibre Bragg gratings is inserted in a capillary pipe (e.g. polyimide), and then wound in the same way as the other optical fibres to lead to the first end of the flexible cable.

According to yet another further characteristic of the invention, the second end of the flexible cable, opposite the first end, is closed by a tip. In a particular embodiment, the tip comprises a microphone.

According to yet another further characteristic of the invention, the support cable is a multi-strand wire.

According to yet another further characteristic of the invention, the flexible cable is an interlocked metal hose.

The invention also relates to a radiation-detecting system in a facility, the system comprising a radiation-detecting device according to the invention and means for introducing by propulsion the radiation-detecting device into the facility.

The object of the invention is a flexible cable having a very low diameter (typically a few millimeters) which contains miniature detectors having a millimeter, or even sub-millimeter size, delivering a linear (1-D) mapping, resisting to high level radiations (typically a few tens of kGy, or even more) and that can be offset by a long distance (typically several tens of meters, or even more).

In the case of very low dose rates, for example lower than 10 µGy/h, it is possible to integrate the dose on an exposure time of several hours, days, weeks, or even months, and thus to obtain an exploitable dose signal (i.e. having a satisfactory signal to noise ratio) to deduce therefrom a mean dose rate with the intended uncertainty which is generally in the order of one percent.

The operating mode which results from the use of the detecting device of the invention has a beneficial impact on work organisation. Since the worksites are rarely operational by night time, the possibility offered by the device of the invention of a night exposure indeed enables organisation requirements to be reduced. Furthermore, the entire sensitive cable can be simultaneously exposed. By way of non-limiting example, sixteen simultaneous readings per day corresponding to sixteen detectors distributed in the flexible cable can be made. Thereby, it is possible to save time upon inspecting the entire infrastructure (duct, vessels, building, etc.) by the use of a plurality of cables in accordance with the cable of the invention.

According to the preferential embodiment of the invention, the detecting device consists of optically stimulated luminescence detectors or OSL detectors which are each optically coupled to the end of optical fibres used, on the one hand, to transmit an optical stimulation light to the OSL detector and, on the other hand, to collect the luminescence emitted by the OSL detector, which results from the exposure thereof to radiations. Advantageously, the optical stimulation of the OSL detector simultaneously causes OSL light emission by the detector and detector resetting.

Also advantageously, the detecting device of the invention enables an operational measurement to be performed, during which the cable can be left in place during the entire reading and resetting operation, which is made on line and remotely. The flexible cable equipped with a plurality of detectors with optical fibres is deposited in the place where it is desired to make activity measurements (infrastructure, hose, vessel, etc.) and left in place, for a duration set by the user depending on the intended activity, the exposure time being all the higher that the intended rate is low. For each of the detectors contained in the flexible cable, the doses are deduced from the luminescences recorded as a result of the optical stimulation. An average dose rate distribution can then be determined on the entire sensitive range of the cable by setting the quotient between the measured doses and the exposure time chosen.

Another advantage of the invention is the absence of electronics in the cable, since this is offset outside the cable, in a dedicated cabinet. In addition, also advantageously, the OSL detectors are not thermalized, which results in that a thermalization electronics can be dispensed with.

Since the optical measurement is naturally immune to electromagnetic disturbances, the device of the invention can be dispensed with bulky triaxial cables. Moreover, the presence of miniature OSL detectors and of beams of optical fibres having small diameters results in optimising the volume of the detecting device, thus enabling the measurement capability to be increased for the same cable outer diameter. At an equivalent volume, it is thereby possible to accommodate a plurality of OSL detectors in the space occupied by a single conventional CZT ("Cadmium Zinc Telluride") sensor.

According to the invention, the measurement dynamics in terms of dose rate typically changes from a few µGy/h to about 10 Gy/h, that is between 5 to 7 orders of magnitude (i.e. equivalent to 17 bits to 24 bits respectively). This dose rate range is much higher than that of conventional detectors.

According to an improvement of the invention, the temperature profile along the flexible cable is determined in parallel to the dose rate profile. Indeed, in the case where the temperature is not known with accuracy, a temperature profile measurement can be made by a fibre Bragg grating array extended along the cable according to known methods (c.f. S. Melle and al., "Practical fibre-optic Bragg grating strain gauge system", Appl. Opt., 32 (19), 1993, pp. 3601-3609). Thereby, it is possible to correct the influence of temperature on the dose measurement. By way of non-limiting example, the correction can be about $0.3\% \cdot K^{-1}$ for reduced alumina crystals.

OSL sensors have a significant radiation resistance such that the cable is not dismantled. This property guarantees time savings in operation but also consumable savings for the operator since the cable lifetime can be very high (typically several years). Furthermore, since the response of the OSL detectors remains stable over time, the duration which separates two consecutive calibrations can be long. By way of non-limiting example, a yearly calibration is sufficient for a continuous exposure under 1 Gy/h (calibration every 10 kGy)).

In the case where reduced alumina crystals are used as OSL detecting elements, the OSL emission occurs about 400 nm for a stimulation in the 480 nm-550 nm range. The transmission of an optical fibre with a fluorine sheathed pure silica core is typically 50 dB/km (0.05 dB/m) at 400 nm. Thus, the OSL signal is attenuated by a factor ½ on a 60 m range. In practice, this imposes to double the integration time necessary for the detector at the end of pipe with respect to that of an equivalent detector, connected close to the instrumentation. The flexible cable can thus advantageously have a length of 50 to 60 meters, or even more, in order to cover a great variety of clean-up applications.

It is possible to reach higher ranges with OSL detectors emitting in red or near Infrared (MgS:Ce,Sm or $Li_2B_4O_7$—Mn for example). Thereby, the attenuation is in the order of 8 dB/km such that the OSL signal is attenuated by a factor ½ on a 400 m range at the wavelength of 650 nm. Such a flexible OSL can then cover significant areas compatible with infrastructures with very great dimensions (plants, storage sites, etc.).

By contrast with the 1-D devices disclosed in U.S. Pat. No. 5,665,972, the originality of the device of the invention resides in the following essential elements:

it can be inserted into a duct by propulsion, which is the most suitable operating mode on a worksite since, frequently, a single access is available to penetrate a facility to be inspected, it can be inserted into ducts with a diameter lower than 1 cm and having a radius of curvature as low as 3 cm, it consists of radiation resistant OSL detectors, that can withstand doses of several tens of kGy without significant variation in their sensitivity, thus enabling to contemplate the manufacture of a non-dismountable cable with a time stable dose response, it is naturally preserved from electromagnetic disturbances and significant offsets can be contemplated, the dose rate range is significant (5 to 7 orders of magnitude) in view of the combination of the dose range (3 to 4 orders) with the integration time range (2 to 3 orders), the same cable can thus be operational in a very strongly "dosing" (typically 10 Gy/h) and low "dosing" (typically 1 µGy/h) environment by consequently modifying the exposure time, the photon energy range is significant (typically from 50 keV to more than 6 MeV), the optical fibres have an "overlength" which enable the flexure of the cable mechanical structure to be accompanied without breaking, and in an improvement of the invention, the device of the invention provides temperature measurements associated with the dose rate measurements thus ensuring, if needs be, a full insensitivity of the measurement to temperature fluctuations.

BRIEF DESCRIPTION OF THE FIGURES

Further characteristics and advantages of the invention will appear upon reading a preferential embodiment made in reference to the appended figures in which.

Throughout the figures, the same references designate the same elements.

DETAILED DISCLOSURE OF EMBODIMENTS OF THE INVENTION

Figure 3:
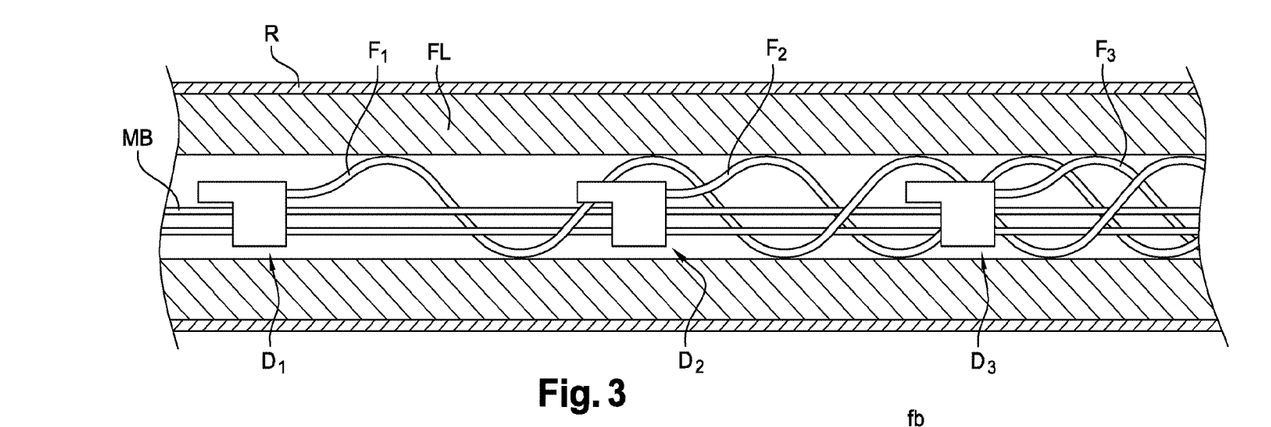
FIG. 3 represents a schematic diagram of radiation-detecting device according to the invention.

FIG. 3 represents a schematic diagram of essential elements which make up a radiation-detecting device according to the invention and FIGS. 4A-4D represent detail views of the detecting device of the invention.

The device comprises a set of OSL detectors $D_i$ (i=1, 2, 3, etc.) placed in the flexible cable FL. The detectors $D_i$ are connected to each other using a support cable MB. Each detector $D_i$ is equipped with a beam of fibres $F_i$. FIG. 4C represents a longitudinal cross-section view of a detector D. FIG. 4D represents a transverse cross-section view of the same detector.

The flexible cable FL is preferentially an interlocked metal hose. The interlocked metal hose can be of the single lock or double lock type. The single lock hose has a greater flexibility and a higher internal/external diameter ratio than the double lock hose, but its mechanical strength is lesser.

Figure 4A:
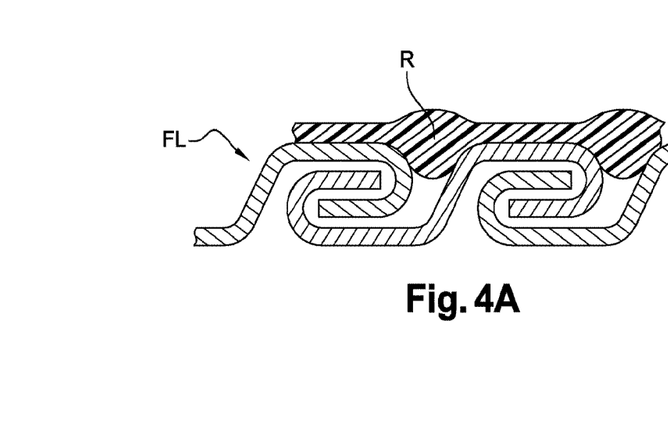
FIGS. 4A-4D represent detail views of the radiation-detecting device of the invention.

In practice, for dismantling applications, a double lock hose such as that represented, for example, in FIG. 4A is preferred. By way of non-limiting example, the double lock hose is made of stainless steel and can be chosen from a very wide range of nominal diameters, typically between 4 mm and 100 mm. In a particular embodiment of the invention, the hose has, for example, an inner diameter of 4.8 mm and an outer diameter of 8.5 mm. The minimum radius of curvature of the hose is 35 mm. Its weight per unit length is, for example, equal to 112 g/m. Other cables can also be used such as, for example, braid based flexible metal sheaths covered with a polyvinyl chloride (PVC) layer. Such metal flexible cables are made from a preformed stainless steel metal strip. Since such cables are likely to be submerged, a polymeric coating R is applied externally, for example by coating. The coating R has also the advantage of facilitating propulsion (reducing friction because of its smooth character) and decontamination (context of dismantling) operations. Among polymers usable for the coating, polyethylene (PE) is recommended by virtue of its temperature (up to 105° C. in its cross linked form) and radiation resistance, and its satisfactory chemical stability, in particular to acids used for clean-up.

As has been mentioned previously, a support cable MB connects the detectors $D_i$ to each other. Unlike prior art (cf. U.S. Pat. No. 5,665,972), the support cable MB is not used to extend or insert the detectors inside a duct. Within the scope of the invention, the strain necessary to extend or insert the detectors in the ducts is applied to the single flexible cable FL. The latter can advantageously withstand a propulsion strain without buckling because, due to its diameter, its flexural rigidity moment is much higher than that of the support cable. Within the scope of the invention, the support cable MB is only used to connect the detectors and hold a constant gap between them.

The overall space of the detecting device of the invention is mainly a function of the diameter of the beams of fibres (generally in the order of 200 µm to 600 µm), which diameter impacts the detection performance. A higher measuring capability can be reached by increasing the cable diameter or by reducing the diameter of the beams of collection fibres (typically 100 µm). The volume occupied by a unit detector $D_i$ and the collected optical signal are two parameters being a function of the squared diameter of the flexible cable FL. Thus, at a constant flexible cable diameter, an increase in capability by a factor 4 (64 fibres), for example, can be reached for a reduction in the diameter of the beams by a factor 2. The signal reduction resulting from this reduction in diameter thus imposes to increase the exposure time by a factor 4 to preserve an identical signal to noise ratio. Within the scope of the invention, the optical fibres used to make a beam of fibres have a low diameter (typically 100 µm to 200 µm). It is thus advantageously possible to readily wind them and to reduce curvature stresses. By way of non-limiting example, an exemplary beam of fibres consisting of 7 fibres arranged according to a hexagonal arrangement is given in FIG. 4B. The fibres fb are assembled by gluing or inserted in a flexible capillary pipe K formed from a radiation resistant polymer, for example silicone, polyurethane, polyethylene or polypropylene. It is also possible to assemble a greater number of fibres with a reduced diameter, for example in beams of 19 fibres.

Figure 4B:
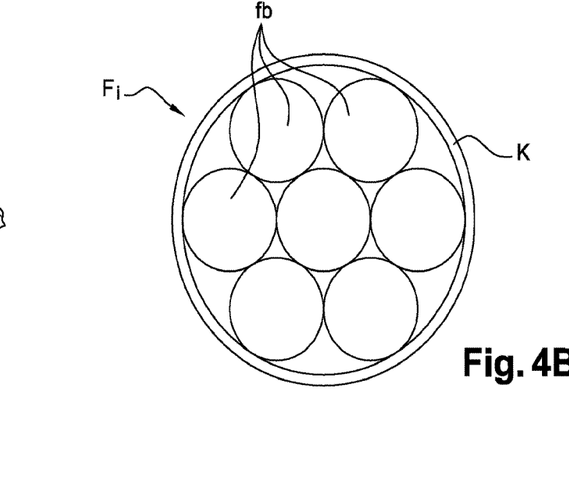
Figures 4C, 4D:
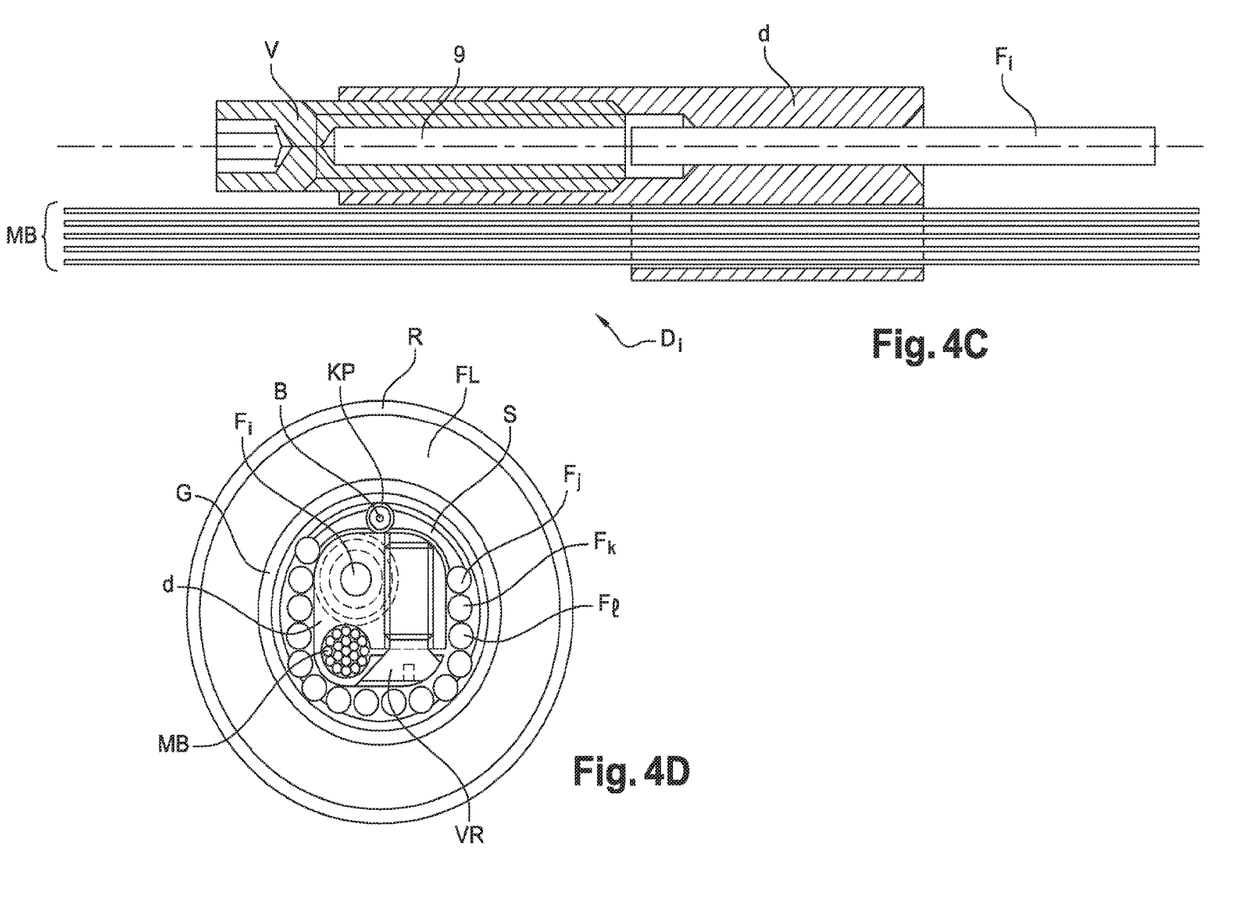

Advantageously, the fibres fb have a low core/clad ratio in order to optimise light collection. The optical fibres are preferentially single mode ones, with a core diameter between 100 μm and 200 μm and have, for example, a numerical aperture NA between 0.22 and 0.48.

It is also possible to use step-index multimode fibres or graded-index multimode fibres, coated with a hard polymer such as polyimide. This polymer is applied as thin films (a few tens of micrometers) and shows good radiation and temperature resistances.

Most fibres are also coated with other acrylate or Tefzel® type polymers which are then removed on the last centimeters to form the beam of fibres. By way of non-limiting examples, the following step-index multimode fibres can be used:
  core 200 μm, clad 225 μm, coating 500 μm, NA=0.39,
  core 200 μm, clad 230 μm, coating 500 μm, NA=0.48,
  core 200 μm, clad 230 μm, coating 500 μm, NA=0.37 or 0.43.

Regardless of the fibre type used, a hexagonal beam of fibres has a more reduced coverage than a single fibre having the external diameter of the beam. Thus, for a total area of 0.22 mm$^2$ covered by seven fibres of a hexagonal beam, the area of a single fibre having the external diameter of the beam would correspond to 0.283 mm$^2$. The area loss is thus about 30%. However, the rigidity of a fibre increases as a function of its cubed diameter. The hexagonal beam with 7 fibres then has a flexibility 27 times higher than that of a single fibre with an equivalent diameter and is thus much easier to wind inside the flexible cable.

Moreover, for a given radius of curvature, the curvature stresses change in proportion to the diameter of the fibre. Thus, the stresses applied to the beam of fibres are three times more reduced than for a single fibre. In practice, the deformation applied to a fibre should remain very lower to one percent to reduce breaking risks. The curvature deformation corresponds to the diameter of the fibre divided by twice its radius of curvature. For a fibre with a 200 μm diameter and a 30 mm minimum radius of curvature, the maximum deformation generated by the curvature is about 0.33%, which is acceptable.

FIG. 4C represents a longitudinal cross-section view of a detector $D_i$ and FIG. 4D represents a transverse cross-section view of the flexible cable at a detector D.

An OSL detector crystal 9 is placed facing the end of a beam of optical fibres $F_i$. The detector crystal 9 and the beam of fibres $F_i$ are placed, facing each other, in two concentric bores of a clamp d. A first bore accommodates the beam of optical fibres $F_i$ and has consequently a diameter required to accommodate the beam of fibres, for example 0.6 mm. The second bore is threaded and accommodates a grub screw V, for example of stainless steel, which contains the detector crystal 9. The detector crystal 9 is fixed downhole, for example by an epoxy type glue having a satisfactory radiation mechanical resistance. The beam of fibres $F_i$ is also fixed in its mount, for example using an epoxy type glue. This method of coupling between the detector crystal 9 and the beam of fibres $F_i$ enables a very low air interval to be left between the crystal and the beam of fibres. It is also possible that the detector crystal 9 and the end of the beam of fibres $F_i$ are in contact of each other. In practice, there is a small air thickness of a few tens of micrometers between the detector crystal 9 and the end of the beam of fibres $F_i$ because of their surface state.

Each clamp is, for example, machined in a stainless steel parallelepiped having dimensions of about 3×3×10 mm$^3$. The steel parallelepiped is, for example, machined by turning on a first part and pierced by a hole having a diameter equivalent to that of the support cable, for example a 1 mm diameter, on a second part. On this second part, the steel parallelepiped is also grooved on an entire half-length in order to form a clamp. The support cable MB is then engaged in the hole and the clamp is tightened on the support cable by two screws VR, for example, of stainless steel. Alternatively, it is possible to secure each clamp to the support cable MB by welding.

By way of non-limiting example, the support cable MB consists of a stainless steel multi-strand wire (e.g. Ø=1 mm), with an elastic modulus close to 200 GPa. A maximum tensile force in the order of 400N (40 kg), corresponding to a stress of 400 MPa, can thereby be applied within the 0.2% yield strain.

To optimise the distribution of the beams of fibres in the flexible cable FL, the different clamps can follow each other with variable angular orientations, for example spirally, along the support cable MB.

The length of the clamps can advantageously be designed as a function of the minimum curvature necessary to be ensured to the flexible cable FL. By way of non-limiting example, for a minimum radius of curvature desired to be 30 mm of a flexible cable FL with an internal diameter equal to 4 mm, the length of the linear segment should not exceed 20 mm. Clamps with a 10 mm length can thereby be chosen not to hinder the curvature of the flexible cable in use.

FIG. 4D represents a transverse cross-section view of the flexible cable at a detector D. The beams of fibres $F_j$, $F_k$, $F_l$, etc. which come from the respective detectors $D_j$, $D_k$, $D_l$, etc. (not represented in the figure) are wound, preferably spirally wound, on a carrier cylinder S made of a deformable solid material, for example a foam cylinder, which surrounds the clamp d (the cylinder S is not represented in FIG. 3 for the sake of convenience).

The beams of fibres $F_j$, $F_k$, $F_l$, etc. are distributed on the carrier cylinder S which is positioned between the internal wall of the flexible cable FL and the clamp d. The internal wall of the cable FL is preferentially covered with a grease film G able to move the beams of fibres. The beams of fibres are wound on the carrier cylinder S before the detectors are mounted in the flexible cable FL. In use, the carrier cylinder S advantageously does not resist to movements of the fibres.

In a particular embodiment of the invention, the fibre Bragg gratings B are photo-recorded in a conventional single mode fibre, which fibre is inserted in a capillary wound, in the manner of the beams of optical fibres, about the carrier cylinder S. Each fibre Bragg grating B is placed as close as possible to a detector crystal 9. In a known manner per se, the Bragg gratings are used for measuring the temperature of the detector crystals 9. Each fibre Bragg grating is photo-recorded at a different Bragg wavelength which enables its position in the hose to be identified.

The flexural behaviour of the detecting cable of the invention is described hereinafter, in the case where the internal diameter of the flexible cable is, for example, equal to 4 mm. In this case, the difference in radius of curvature between two beams of fibres located at both ends of an internal diameter of the flexible cable aligned with the radius of curvature of the flexible cable is substantially equal to 4 mm.

The beam of fibres farthest from the centre of the radius of curvature then travels a higher distance than the other beam of fibres, by substantially 25 mm for a full turn of the cable FL. Concretely, the worst case corresponds to the storage situation for which the flexible cable is always wound in the same direction (cf. FIG. 7). For winding a 20 m long cable on a storage turntable having a radius of 150 mm, 21 turns are necessary for winding the full cable on the turntable. The length offset between both beams of fibres located at both ends of the internal diameter of the cable is thereby substantially equal to 525 mm (i.e. 21×25 mm).

According to the preferential embodiment of the invention, the beams of fibres are helically wound about the axis of the flexible cable. For a given length of a rectilinear fraction of the flexible cable, each beam of fibre has consequently a length higher than the length of the rectilinear fraction of the cable. In the following of the description, the difference between the length of the beam of fibres and the length of the rectilinear fraction of the cable which corresponds thereto is called an "overlength". In the case where the internal diameter of the cable is substantially equal to 4 mm, the helices have, for example, a pitch in the order of 50 to 60 mm. According to this configuration, the overlength obtained by helical winding is about 1.55 mm per pitch of 50 mm, that is an overlength of 31 mm/m which is then sufficient to wind the cable on a turntable having a radius of 150 mm without deterioration risk.

The manufacture of the detecting device according to the invention will now be described. All the detectors $D_i$ and the beams of fibres $F_i$ are first wound on the carrier cylinder and covered with grease in order, on the one hand, to facilitate their insertion into the flexible cable and, on the other hand, to facilitate the movement of fibres inside the cable during subsequent decontamination operations. A wire puller as a rigid rod, having a length substantially equal to that of the flexible cable FL, is then connected to the support cable and introduced into the flexible cable, at a first end of the flexible cable. The flexible cable is held rectilinear upon introducing the wire puller. The wire puller is then pulled out from the flexible cable, at the end of the flexible cable which is opposite the first end, thus driving all the detectors $D_i$ inside the cable. Once all the detectors $D_i$ are placed inside the flexible cable, the wire puller is removed and a protective sealing tip is positioned at the end of the flexible cable which is located opposite to the end through which the beams of fibres come out. This tip is detailed below in reference to FIGS. 5A and 5B. At the sealing tip, the support cable MB is severed and the end thereof is preferentially left free. At the end of the flexible cable FL located opposite the tip, the beams of fibres $F_i$, $F_j$, $F_k$, $F_l$, etc., the capillary KP and the support cable MB are connected to a flange as detailed in reference to FIGS. 6 and 7 below.

Figure 5A:
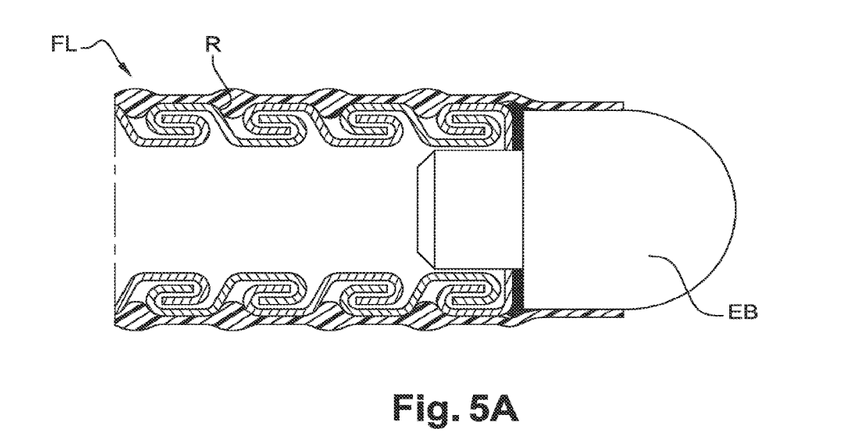
FIGS. 5A and 5B represent elements for closing the radiation-detecting device of the invention.
Figure 5B:
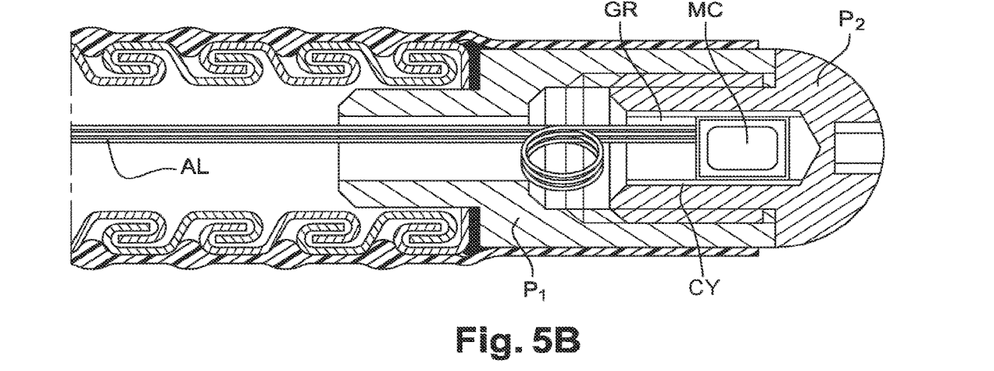

FIGS. 5A and 5B represent elements for closing the flexible cable.

FIG. 5A represents an element for closing the flexible cable according to a first embodiment of the invention. By way of non-limiting example, the closing element is a steel plug EB which is welded to the end of the flexible cable FL. The steel plug is for dampening the cable shocks as it progresses in a duct.

FIG. 5B represents an element for closing the flexible cable according to a second embodiment of the invention. The closing element according to the second embodiment of the invention comprises a microphone MC. A first part $P_1$ of the closing element is a mount, preferentially of stainless steel, which is made integral with the flexible cable by welding and a second part $P_2$ is a plug, preferentially of duralumin, consisting of a hemispherical head screw screwed to the mount. The microphone MC is inserted into a cylinder CY, preferentially of silicone, to protect it from shocks and embedded in a grease GR which ensures acoustical coupling with the plug. The microphone MC is connected to electrical wires AL. The electrical wires AL are for electrically powering the microphone and recovering the electrical signal delivered by the microphone. By way of non-limiting example, three electrical wires come out of the microphone and are connected, by welding, to three electrical wires present in the flexible cable FL. If necessary, the excess wires are wound. One of the power supply electrical wires can be electrically connected to a wire of the multi-strand cable in order to reduce the number of wires present in the flexible cable.

The use of a closing element equipped with a microphone occurs, for example, upon extending a flexible cable in a pool. Within such a context, an ultrasound acoustical location can be implemented. The microphone is, for example, a miniature microphone known as MEMS (Micro-Electrical-Mechanical Systems) microphone. In a particular embodiment (not represented in the figures), several microphones can also be disposed in different locations inside the flexible cable the diameter of which is then adapted to the presence of the microphones. It is then possible to account for the extension of the cable under water. The location is achieved, in a known manner per se, by submerging at least three sound sources in the pool to be inspected. A possible mode of operation is to sequentially emit, by each source, a pulse periodical sound signal at an arbitrary frequency, for example close to 20 kHz, in order to reduce sound overlaps due to echoes on the walls. The three signals sequentially received by the MEMS microphone(s) accommodated in the flexible cable are then synchronised with respect to the respective emission signals in order to determine the time delays thereof. The distance between a microphone accommodated in the flexible cable and the local frame reference which carries the three sound sources is then determined from the three time delays measured and the known sound velocity in water.

Figure 6:
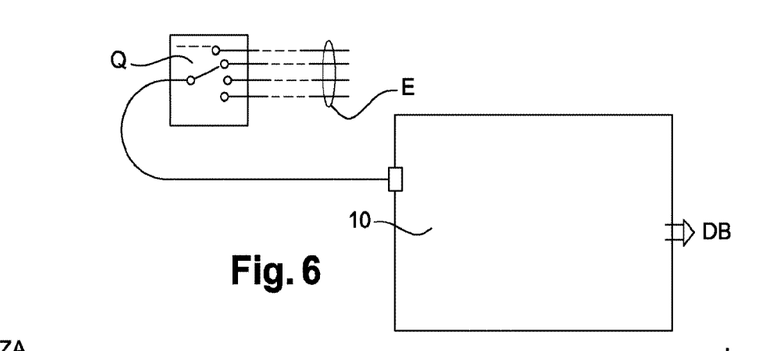
FIG. 6 represents a schematic diagram of a dose rate measuring instrumentation associated with the radiation-detecting device of the invention.

FIG. 6 represents a schematic diagram of a dose rate measuring instrumentation associated with the radiation-detecting device of the invention.

The beams of optical fibres which come out from the end of the flexible cable FL located opposite the closing plug make-up a set of beams of fibres E. The beams of fibres of the set E are connected to an optical switch Q. The number of beams of fibres is equal to the number of detectors $D_i$, for example 16. The optical switch Q is connected to an optoelectronic detection block 10. In a known manner per se, the optoelectronic detection block 10 contains a laser, a photomultiplier, an electromechanical shutter and filters for filtering a laser light before stimulating OSL detectors and the luminescence resulting from a detection, after collection by the beams of fibres (cf. Magne and al. "*Multichannel dosemeter and $Al_2O_3$ Optically Stimulated Luminescence fibre sensors for use in radiation therapy—evaluation with electron beams*" Radiat. Prot. Dosim. 131(1), 2008, pp 93-99).

The instrumentation described in FIG. 6 performs reading of the different detectors sequentially. For electronuclear applications, in dismantling and in radiation protection, readouts of ambient dose rates should be performed under exposure by uncontrolled permanent sources. For this reason, a prior reset is always made before exposure. The protocol occurs consequently in the following way:

prior optical stimulation carrying out a prior reset of all the OSL detectors, stopping the prior optical stimulation and exposure of the OSL detectors during a time T defined by the user (a few minutes, hours, days, or even weeks or months), subsequent optical stimulation with reading of the OSL luminescences from the different OSL detectors and resetting all the detectors.

In a known manner per se, the optoelectronic detection block 10 delivers, from the reading data of the OSL luminescence, dose rate data DB for each of the OSL detectors.

A unit OSL signal detected by the block 10 consists of an OSL pulse and a base line. The base line is a signal which results from the contribution of different phenomena, namely:
- background noise of the OSL detector,
- fluorescence of the deep traps of the OSL detector crystal,
- scintillation and Cerenkov effect in the fibre which propagates the OSL pulse, which are a function of the radiating nature of the environment present about the flexible cable.

The OSL pulse reaches an asymptotic minimum at the end of a reading time $T_{OSL}$, once substantially all the traps present in the detector crystal have been emptied (typically 99.9%). A measurement of the mean value of the asymptotic minimum is then made on the last recording points. This mean value is then subtracted from the OSL pulsed signal throughout the period $T_{OSL}$. The corrected signal which results from this subtraction is independent from the external disturbances and, in particular, from the Cerenkov effect. The corrected signal is then integrated on the entire time band and then weighted by a calibration coefficient to deduce therefrom the dose D integrated on the entire exposure time. The mean dose rate DdD is then estimated by dividing the dose D by the exposure time T:

$$DdD=D/T.$$

The user can make a periodical acquisition sequence or a single measurement. In the case where the user makes several acquisitions periodically, the protocol is advantageously reduced to two phases (exposure and optical stimulation) since the optical stimulation makes resetting for the next measurement.

Likewise, the user can make several measurements on several parallel cables for the purpose of saving time in the overall dosimetry of a facility. This option is particularly advantageous in a low dosing environment, with high exposure times (in the order of one day, or even one week or one month). In this case, the resetting operations are time-stamped for all the lines which are analysed in parallel.

The disconnection of the flexible cable enables the operator to come out from the zone during the exposure phase. This phase has thereby little impact on the personnel exposure and its duration can be chosen as long as necessary, since the parallel operating mode enables time to be saved on reading.

In a preferential embodiment of the invention, an OSL crystalline fibre with a 0.5 mm diameter and 5 mm length is an interesting trade-off. The dose resolution is estimated at about 0.7 mGy with $Al_2O_3$:C crystals. By way of non-limiting example, for an exposure time of 18 hours, the mean dose rate resolution is 0.7 mGy/18 h that is 40 µGy/h. Such a duration can then be obtained easily by triggering the integration at the end of the day at about 4 p.m. and by performing dose readings the following morning at about 10 a.m. Still by way of example, it is also possible to integrate, during an entire week (i.e. 168 hours), measurement data at the end of a clean-up worksite. The dose rate resolution is consequently in the order of 0.7 mGy/168 h, that is 4 µGy/h.

The detecting device of the invention advantageously enables a high dynamics in terms of dose rate (5 to 7 decades) to be reached by virtue of the combination of the dose range (3 to 4 decades) and the exposure time range (2 to 3 decades).

The interest of a 1-D sensitive cable is to make a readout of several measurements at different points (linear mapping of the activity) simultaneously in order to save time in dosimetry. Indeed, the readings can thereby be made simultaneously at different points and no longer sequentially as is the case by moving a point sensor on the entire scene to analyse.

Figure 7:
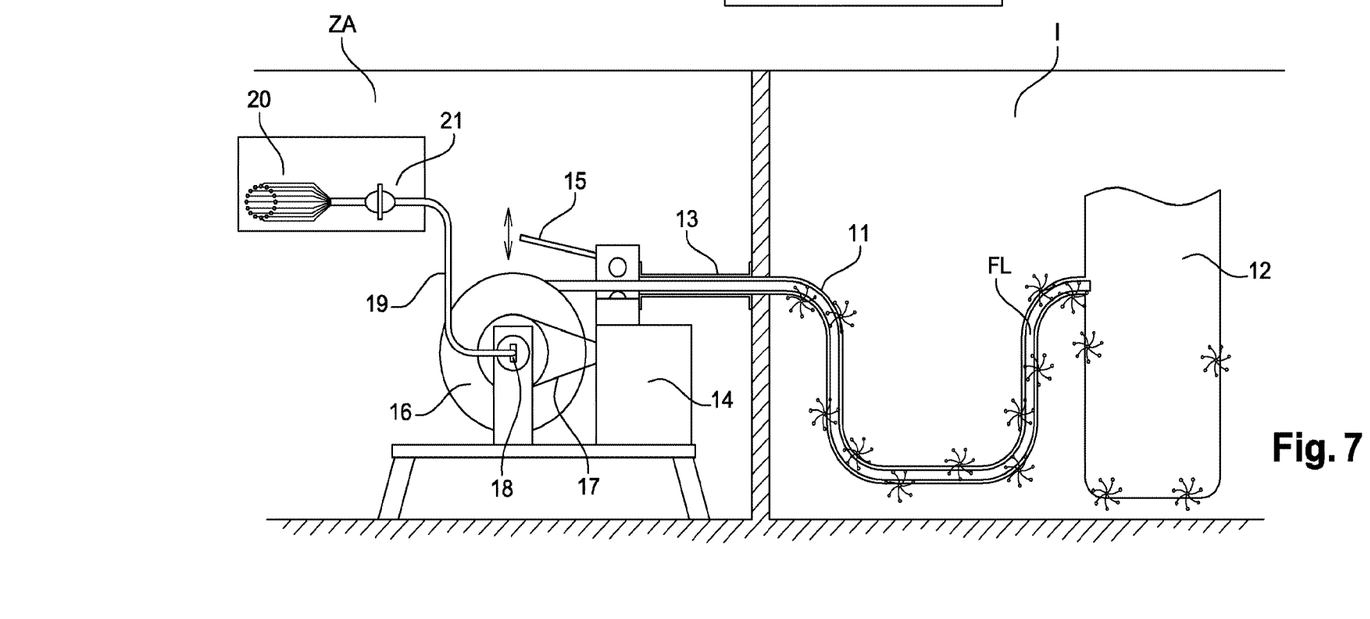
FIG. 7 represents a radiation-detecting system in a facility, the system using a radiation-detecting device in accordance with the device of the invention.

FIG. 7 represents a radiation-detecting system in a facility which uses a detecting device in accordance with the device of the invention. Generally, the facility can be a contaminated facility or a facility which, without being contaminated, is exposed to radiations. In the example of FIG. 7, the facility I is a contaminated facility which consequently has to be decontaminated.

The facility to be decontaminated I comprises, for example, a duct 11 and a vessel 12 in which the duct 11 leads. The flexible cable FL equipped with detectors is introduced into the duct 11 from a non-contaminated zone ZA which is accessible to users. The flexible cable FL is introduced into the facility I using a propelling device which comprises an injecting tube 13, a motor 14 equipped with a control lever 15, a turntable 16 on which the flexible cable is wound and mechanical driving means 17 which connect the motor to the turntable. The turntable 16 is equipped with a multi-fibre connector 18 which connects both ends of the bent-out optical fibres which lead from the flexible cable to a measuring instrumentation. The measuring instrumentation comprises, for example, a multi-fibre optical cable 19, a multi-channel connector 20 and a measuring unit 21.

The purpose is to make readouts of dose rate inside the duct and the vessel and thus, to follow-up the clean-up process. The facility I remains inaccessible as long as the clean-up is not ended.

As is described below, the measurements occur in three phases.

Phase 1: Cable Propulsion

The operator has disconnected beforehand the multi-fibre optical cable 19 from the turntable. If he has forgotten to do so, the presence of the connector in its housing prevents the motor to be started up.

The end of the flexible cable FL initially wound about the turntable 16 is engaged in the injecting tube 13. The injecting tube 13 is connected to the inlet of the duct 11. When the operator triggers the control lever 15 in the "propulsion" position, the rotation of the motor 14 is activated at a controlled speed and the mechanical driving means 17 rotate the turntable. The flexible cable FL is then propelled in the duct 11.

Driving rollers are used for propelling the flexible cable. The driving pressure of the rollers is adjustable up to a maximum value depending on the cable strength. For example, for a cable resisting at 200 kg, the maximum strain could be limited to 50 kg in order to take a safety coefficient into account. In case of a blockage due, for example, to an unexpected decrease in the cross-section area of the duct, propulsion is naturally stopped and the cable is saved as soon as the reaction force is higher than the friction force. The operator should then stop the propulsion operation to analyse the blockage cause.

When the cable is integrally extended, the core acting as a stop abutment collides with the injecting tube 13 and blocks the cable to avoid destroying the optical link adapted to the turntable hub. The driving rollers then slip and the operator has to shut down the motor and switch to neutral.

Phase 2: Exposure and Rate Readout

When the flexible cable reaches the wanted position, regardless of whether the cable is fully wound or not, the operator puts the motor to neutral.

The operator then connects the measuring instrumentation 19, 20, 21 to the connector 18 accommodated in the turntable hub. As has been previously mentioned in reference to FIG. 6, the measuring instrumentation comprises means able to optically stimulate the OSL detectors. The optical stimulation of the OSL detectors can thus be made. Preferentially, the connection of the measuring instrumentation to the connector 18 deactivates the power supply to the motor and prevents the same to be rotated.

The operator can then either leave the measuring instrumentation connected and wait for the exposure end, or disconnect the measuring instrumentation to make the optical stimulation of other flexible cables.

In any case, at the end of the exposure time, the measuring instrumentation has to be connected to the connector 18 such that luminescences which result from the detection of nuclear radiations are read. In the—undesired—case where the operator forgets to connect the measuring instrumentation and still triggers the data acquisition, nothing happens since the flexible cable FL is not connected. The user then observes no signal and an error message appears on the screen informing him/her about the anomaly. The operator is then requested to connect the measuring instrumentation and to make a reading. Based on the luminescence data read, the calculating unit 20 calculates the dose rates.

Phase 3: Cable Rewinding

Once the luminescences are read, the operator again disconnects the multi-fibre cable 19 of the turntable which enables the motor to be rotated again. The operator can then trigger the rewinding of the cable on the turntable by actuating the level 15 in the "rewinding" position. This operation is made by rotating a second hub driving a belt which transmits the rotation strain to the turntable. The turntable is then rotated in the reverse direction to the direction of phase 1 and the flexible cable FL is rewound, preferentially in "zigzag" (combination of alternate rotational movement and translational movement) to distribute homogeneously the cable throughout the surface of the turntable. Other rewinding protocols can also be contemplated.

It is advantageously possible to readily disconnect the measuring instrumentation of the flexible cable FL, regardless of whether it is in the propulsion/rewinding phase or in radiation exposure phase. The measuring instrumentation can then be reused to make measurements with other cables propelled beforehand in other ducts for the purpose of saving time in the follow-up of the contamination of the overall facility.

Advantageously, temperature measurements can be made in parallel, if this turns out to be necessary, thanks to a single mode fibre present in the multi-fibre optical cable 19 and connected, via the connector 18, to the single mode fibre which contains the fibre Bragg gratings present in the flexible cable. Furthermore, when this turns out to be necessary, for example for measurements in a pool, an electrical connector (not represented in the figure) recovers the signal from the microphone(s) incorporated in the flexible cable FL.

The multi-fibre optical cable 19 is connected to the connector 18 integral with the turntable. The optical cable 19 is disconnected during propulsion and rewinding phases given that the turntable is rotated during both these phases. In one embodiment, the optical cable 19 includes a core (two half-shells) screwed at the terminal part (at a few tens of centimeters from the end) which acts as a mechanical abutment. The unwinding of the cable, guided by a guide tube at the outlet of the turntable, is then naturally blocked when the core collides with the guide tube. In addition, a sensor for the presence of the plugged connector triggers a safety preventing the motor from being started up in case it is forgotten. The presence of the connector deactivates the motor power supply and thus prevents the same from rotating (and thus the optical cable from being destroyed).

The logistic interest of the flexible cable equipped with OSL detectors of the invention will now be described.

The utilisation of the 1-D cable of the invention enables time to be saved on the overall dosimetry of the facility investigated and consequently indirectly contributes to optimising the cost of a clear-up operation. This operating mode is particularly interesting from the logistic point of view in low "dosing" environments characterised by high exposure times (in the order of one day to one week).

The user can made 1-D curvilinear readouts using a single cable. In this case, the 1-D cable can remain connected to its reading instrumentation or be disconnected, which enables the operator to come out from the zone during the exposure phase. By way of non-limiting example, for 16 simultaneous measuring points read out with a flexible cable, the total duration DT of a 1-D OSL dosimetry operation is:

$$DT=T+32\times T_{OSL}, \text{ where}$$

T is the exposure duration (for example a few tens of minutes, several hours, several days or several weeks), and $T_{OSL}$ is the reading and reset duration of the OSL detectors (typically in the order of a few tens of seconds).

The user can also carry out 2-D readouts by extending N 1-D flexible cables in parallel, for example 8 cables. In this case, the N 1-D cables are extended and simultaneously disconnected and the reset and reading operations are time-stamped for all the curves analysed in parallel. The total duration DT of the 2-D OSL dosimetry operation is then, for 16 simultaneous measuring points read out with a flexible cable:

$$DT=T+32\times 8\times T_{OSL}, \text{ that is}$$

$$DT=T+256\times T_{OSL}.$$

Let us consider a dose rate of 6 mGy/h. By assuming an exposure time of 2 hours, the OSL measurement resolution of the dose rate is substantially 0.25 mGy/h (SNR=24). The total duration of the OSL dosimetry operation is then 2.25 hours for 16 1-D measuring points and 4.1 h for 128 2-D measuring points. It is possible to compare these OSL dosimetry durations to the duration of a point (0-D) conventional dosimetry made using a miniature CZT detector (a few mm³) that can be inserted and moved in a duct. The acquisition duration is in the order of 15 minutes for a typical dose rate of 6 mGy/h (cf. A. Rocher, N. Blanc de Lanaute <<Caractérisations par spectrométrie gamma Cd—Zn—Te de la contamination des circuits des centrales nucléaires>>, Congrès SFRP 2013, Paris). Consequently, the dosimetry duration with the CZT detector is 4 hours (16×15 minutes=4 h) in 1-D and 32 hours (128×15 min=32 h) in 2-D.

At an equivalent performance, the 1-D/2-D OSL dosimetry made with the device of the invention is thus quicker than the 0-D dosimetry made with a CZT detector. Moreover, the 0-D conventional measurement requires an operator permanently on stand-by duty since the readings are made sequentially. However, the OSL methodology relays on a nearly simultaneous reading mode of all the detectors at the same time in an automated manner. Thus, the presence of an operator is only required for triggering the OSL reading protocol.

This parallel OSL methodology thus enables time to be saved in the dosimetry operation itself as well as in operator time.

In parallel to the economic interest of the use of the detecting device of the invention, a linear mapping of the activity enables the statistical origin measurement uncertainty to be reduced, for a measurement time identical to that of a single moved detector. Indeed, let us consider a single point (0-D) detector delivering a dose rate measurement with a given uncertainty at the end of an exposure time T. A total time N×T is thus required to analyse the N measuring points of the scene.

However, let us consider now the case of the cable consisting of N detectors simultaneously exposed during the same exposure time T. The measurement statistics are then the same and the measuring time is reduced by a factor N. This same cable exposed during a duration N×T thereby delivers a dose rate measurement with an uncertainty improved by a factor with respect to a single moved detector.

With an identical dosimetry duration of a scene, the 1-D measurement thus enables the results of dose rate measurements to be improved. For 16 points, the measuring uncertainty is, for example, improved by a factor 4. For a plurality of 8 cables with 16 simultaneously exposed detectors, the measurement uncertainty is, for example, improved by a factor 11 with respect to a single detector.

The invention claimed is:

1. A radiation-detecting device comprising:
   at least two radiation detectors distributed in series along a support cable, wherein each detector comprises an optically stimulated luminescence detection element which is optically coupled to at least one optical fiber,
   each optically stimulated luminescence detection element being held opposite a first end of the optical fiber by a mechanical part fixed to the support cable,
   the mechanical part being held in a flexible cable by holding means which comprises a carrier cylinder made of a deformable solid material on which the optical fibers are wound, second ends of each optical fiber leading to a same first end of the flexible cable.

2. The radiation-detecting device according to claim 1, wherein the mechanical part which encloses the support cable comprises a first bore and a second bore aligned with each other, the optically stimulated luminescence detection element being fixed in the first bore and the optical fiber being fixed in the second bore.

3. The radiation-detecting device according to claim 1, wherein the optical fibers are helically wound.

4. The radiation-detecting device according to claim 1, wherein the deformable solid material is a polymer.

5. The radiation-detecting device according to claim 1, wherein a plurality of optical fibers is coupled to a same optically stimulated luminescence detection element, the plurality of optical fibers being gathered in a capillary pipe as a beam of optical fibers.

6. The radiation-detecting device according to claim 1, further comprising a grease layer that covers an internal wall of the flexible cable.

7. The radiation-detecting device according to claim 1, further comprising a polymer layer that covers an external wall of the flexible cable.

8. The radiation-detecting device according to claim 1, wherein a single mode optical fiber containing a plurality of fiber Bragg gratings is fixed in the mechanical part, the optical fiber having an end leading to the first end of the flexible cable.

9. The radiation-detecting device according to claim 1, wherein the support cable is a multi-strand wire.

10. The radiation-detecting device according to claim 1, wherein the flexible cable is an interlocked metal hose.

11. The radiation-detecting device according to claim 1, wherein nominal diameter of the flexible cable is between 4 mm and 100mm.

12. The radiation-detecting device according to claim 1, wherein diameter of the core of a multimode optical fiber is between 100 µm and 200 µm.

13. The radiation-detecting device according to claim 1, wherein a second end of the flexible cable, opposite the first end, is closed by a tip.

14. The radiation-detecting device according to claim 13, wherein the tip comprises a microphone.

15. A radiation-detecting system in a facility, the system comprising:
   a radiation-detecting device and introduction means for introducing the radiation-detecting device into the facility,
   wherein the radiation-detecting device is a device according to claim 13, and
   wherein the introduction means comprises a turntable on which the flexible cable is wound, an injecting tube which opens into the facility and in which the tip of the flexible cable is engaged, and propulsion means for propelling the flexible cable into the facility.

16. The radiation-detecting detecting system according to claim 15, wherein the propulsion means comprises a motor and mechanical means connected to the motor and configured to rotate the turntable once a propulsion command is applied to the motor.

17. The radiation-detecting detecting system according to claim 15, wherein a multi-fiber connector fixed to the turntable connects both ends of the optical fibers to a measuring instrumentation configured to stimulate the optically stimulated luminescence detection elements and to read a luminescence which results from radiation exposure.

* * * * *